(12) United States Patent
Nishi

(10) Patent No.: US 12,272,086 B2
(45) Date of Patent: Apr. 8, 2025

(54) CALCULATION OF PACKAGE LENGTH USING DEPTH IMAGE DATA OF PACKAGE

(71) Applicant: NEC Platforms, Ltd., Kawasaki (JP)

(72) Inventor: Youhei Nishi, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 416 days.

(21) Appl. No.: 17/775,389

(22) PCT Filed: Mar. 10, 2020

(86) PCT No.: PCT/JP2020/010237
§ 371 (c)(1),
(2) Date: May 9, 2022

(87) PCT Pub. No.: WO2021/095281
PCT Pub. Date: May 20, 2021

(65) Prior Publication Data
US 2022/0392095 A1 Dec. 8, 2022

(30) Foreign Application Priority Data
Nov. 14, 2019 (JP) .................................. 2019-206130

(51) Int. Cl.
*G06T 7/60* (2017.01)
*G06T 7/73* (2017.01)

(52) U.S. Cl.
CPC .................. *G06T 7/60* (2013.01); *G06T 7/73* (2017.01); *G06T 2207/10028* (2013.01)

(58) Field of Classification Search
CPC ... G06T 7/60; G06T 7/73; G06T 2207/10028; G06T 7/11; G06T 7/174; G06T 7/62; G06T 7/194; G01B 11/00; G01B 11/02
See application file for complete search history.

(56) References Cited

U.S. PATENT DOCUMENTS

2017/0116571 A1 4/2017 Tammattabattula
2018/0202797 A1* 7/2018 Kawashima ......... G01B 11/022
(Continued)

FOREIGN PATENT DOCUMENTS

JP   2004-083149 A   3/2004
JP   2005-114744 A   4/2005
(Continued)

OTHER PUBLICATIONS

International Search Report for PCT Application No. PCT/JP2020/010237, mailed on Jun. 16, 2020.
(Continued)

*Primary Examiner* — Christopher Wait

(57) ABSTRACT

A package measuring apparatus includes a control unit and a depth sensor that picks up a package having a rectangular parallelepiped shape placed on a mounting table from substantially directly above the package. The control unit is configured to: specify data of the package in an acquired depth image data by comparing with background depth image data; calculate a height of the package and specify positions of three vertices located on a leftmost, rightmost, and uppermost or lowermost side in the depth image data; obtain two-dimensional coordinates of the three vertices based on a view angle of the depth sensor, data of a distance from the depth sensor corresponding to the three vertices, data of a position of each sensor element, and the number of sensor elements; and calculate a length of two sides defined between a third vertex and other two vertices based on the two-dimensional coordinates.

11 Claims, 12 Drawing Sheets

(56) References Cited

U.S. PATENT DOCUMENTS

2018/0330461 A1 11/2018 Adachi et al.
2019/0041190 A1* 2/2019 Okamura .............. G01B 11/026
2021/0350561 A1* 11/2021 Nishi ...................... G06T 7/543

FOREIGN PATENT DOCUMENTS

| JP | 2011-196860 | A | 10/2011 |
| JP | 2013-025428 | A | 2/2013 |
| JP | 2015-194424 | A | 11/2015 |
| JP | 2018-112521 | A | 7/2018 |
| JP | 2018-194963 | A | 12/2018 |
| JP | 2019-028022 | A | 2/2019 |
| JP | 2021-025853 | A | 2/2021 |
| WO | 2017/042747 | A1 | 3/2017 |

OTHER PUBLICATIONS

JP Office Action for JP Application No. JP2019-206130, mailed on Jun. 16, 2020 with English Translation.
JP Office Action for JP Application No. JP2019-206130, mailed on Oct. 5, 2021 with English Translation.

* cited by examiner

CALCULATION OF PACKAGE LENGTH USING DEPTH IMAGE DATA OF PACKAGE

This application is a National Stage Entry of PCT/JP2020/010237 filed on Mar. 10, 2020, which claims priority from Japanese Patent Application 2019-206130 filed on Nov. 14, 2019, the contents of all of which are incorporated herein by reference, in their entirety.

TECHNICAL FIELD

The present disclosure relates to a package measuring apparatus, a package accepting system, a package measuring method, and a program.

BACKGROUND ART

Convenience stores and the like provide a service of accepting a shipping order for a package dropped off at the store as one of their services. At this time, the size of the package is measured at the store according to standard criteria for acceptance of shipping orders set by each shipping carrier and a shipping charge is calculated at the store according to the rate of each shipping carrier. Specifically, a store clerk receives an object to be shipped from a customer and measures the size of the object to be shipped. Then, the store clerk inputs information items such as the shipping carrier, the type of shipment, and the shipping destination acquired from a sheet on which the information items are filled-in, into a POS (Point of sale) terminal, calculates the shipping charge, and performs checkout processing for the calculated shipping charge.

Measuring the size of the package is burdensome and time-consuming for the store clerk. To solve this problem, for example, Patent Literature 1 discloses a technique of measuring the size of a package by picking-up an image of the package.

CITATION LIST

Patent Literature

Patent Literature 1: Japanese Unexamined Patent Application Publication No. 2015-194424

SUMMARY OF INVENTION

Technical Problem

However, with the technique disclosed in Patent Literature 1, it is necessary to attach a reference label whose size is known to a package having a rectangular parallelepiped shape in advance.

An object of the present disclosure is to provide a package measuring apparatus, a package accepting system, a package measuring method, and a program capable of measuring a size of a package even when a reference label whose size is known is not attached to the package in advance.

Solution to Problem

A package measuring apparatus according to a first example aspect of the present disclosure includes: a depth sensor disposed at a position at which the depth sensor is able to pick-up an image of a package having a rectangular parallelepiped shape and placed on a mounting table from substantially directly above the package, and configured to acquire a distance to the package by picking-up the image of the package; and a control unit configured to calculate a size of the package based on data acquired from the depth sensor, in which the control unit performs the processing of: picking-up an image of the mounting table on which nothing is placed using the depth sensor in advance and storing the picked-up image as background depth image data; controlling the depth sensor, acquiring depth image data of the package by picking-up the image of the package placed on the mounting table from substantially directly above the package using the depth sensor, and specifying data of the package in the depth image data of the package by comparing the depth image data of the package with the background depth image data; calculating a height of the package based on data of a distance from the depth sensor to an upper surface of the package in the depth image data of the package and data of a distance from the depth sensor to an upper surface of the mounting table in the background depth image data of the package, and specifying a position of a first vertex positioned on a leftmost side in the depth image data of the package, a position of a second vertex positioned on a rightmost side in the depth image data of the package, and a position of a third vertex positioned on an uppermost side or a lowermost side in the depth image data of the package; obtaining two-dimensional coordinates of the first vertex, the second vertex, and the third vertex in a space in which a center of the depth sensor is set as a point of origin based on a view angle of the depth sensor, data of a distance from the depth sensor to each of the first vertex, the second vertex, and the third vertex, respectively, the number of sensor elements of the depth sensor, and data of a position of each sensor element of the depth sensor corresponding to each of the first vertex, the second vertex, and the third vertex, respectively; and calculating, based on the two-dimensional coordinates of the first vertex, the second vertex, and the third vertex, a length of a first side defined between the first vertex and the third vertex, and a length of a second side defined between the second vertex and the third vertex, to output a calculated result.

A package measuring method according to a second example aspect of the present disclosure is a package measuring method for calculating a size of a package using a depth sensor disposed at a position at which the depth sensor is able to pick-up an image of a package having a rectangular parallelepiped shape and placed on a mounting table from substantially directly above the package, and configured to acquire a distance to the package by picking-up the image of the package, the method including: picking-up an image of the mounting table on which nothing is placed using the depth sensor in advance and storing the picked-up image as background depth image data; controlling the depth sensor, acquiring depth image data of the package by picking-up the image of the package placed on the mounting table from substantially directly above the package using the depth sensor, and specifying data of the package in the depth image data of the package by comparing the depth image data of the package with the background depth image data; calculating a height of the package based on data of a distance from the depth sensor to an upper surface of the package in the depth image data of the package and data of a distance from the depth sensor to an upper surface of the mounting table in the background depth image data of the package; specifying a position of a first vertex positioned on a leftmost side in the depth image data of the package, a position of a second vertex positioned on a rightmost side in the depth image data of the package, and a position of a third vertex positioned on an uppermost side or a lowermost side in the depth image data of the package; obtaining two-dimensional coordinates of the first vertex, the second vertex, and the third vertex in a space in which a center of the depth sensor is set as a point of origin based on a view angle of the depth sensor, data of a distance from the depth sensor to each of the first vertex, the second vertex, and the third vertex, respectively, the number of sensor elements of the depth sensor, and data of a position of each sensor element of the depth sensor corresponding to each of the first vertex, the second vertex, and the third vertex, respectively; and calculating, based on the two-dimensional coordinates of the first vertex, the second vertex, and the third vertex, a length of a first side defined between the first vertex and the third vertex, and a length of a second side defined between the second vertex and the third vertex, to output a calculated result.

A program according to a third example aspect of the present disclosure is a program for causing a computer to perform calculation processing of calculating a size of a package using a depth sensor disposed at a position at which the depth sensor is able to pick-up an image of a package having a rectangular parallelepiped shape and placed on a mounting table from substantially directly above the package, and configured to acquire a distance to the package by picking-up the image of the package, the calculation processing including: picking-up an image of the mounting table on which nothing is placed using the depth sensor in advance and storing the picked-up image as background depth image data; controlling the depth sensor, acquiring depth image data of the package by picking-up the image of the package placed on the mounting table from substantially directly above the package using the depth sensor, and specifying data of the package in the depth image data of the package by comparing the depth image data of the package with the background depth image data; calculating a height of the package based on data of a distance from the depth sensor to an upper surface of the package in the depth image data of the package and data of a distance from the depth sensor to an upper surface of the mounting table in the background depth image data of the package, and specifying a position of a first vertex positioned on a leftmost side in the depth image data of the package, a position of a second vertex positioned on a rightmost side in the depth image data of the package, and a position of a third vertex positioned on an uppermost side or a lowermost side in the depth image data of the package; obtaining two-dimensional coordinates of the first vertex, the second vertex, and the third vertex in a space in which a center of the depth sensor is set as a point of origin based on a view angle of the depth sensor, data of a distance from the depth sensor to each of the first vertex, the second vertex, and the third vertex, respectively, the number of sensor elements of the depth sensor, and data of a position of each sensor element of the depth sensor corresponding to each of the first vertex, the second vertex, and the third vertex, respectively; and calculating, based on the two-dimensional coordinates of the first vertex, the second vertex, and the third vertex, a length of a first side defined between the first vertex and the third vertex, and a length of a second side defined between the second vertex and the third vertex, to output a calculated result.

Advantageous Effects of Invention

According to the present disclosure, a package measuring apparatus, a package accepting system, a package measuring method, and a program capable of measuring a size of a package even when a reference label whose size is known is not affixed to the package in advance can be provided.

DESCRIPTION OF EMBODIMENTS

Hereinbelow, example embodiments will be described with reference to the drawings. Note that in the example embodiments, the identical reference symbols denote identical or equivalent structural elements and redundant explanations thereof are omitted.

First Example Embodiment

Figure 1:
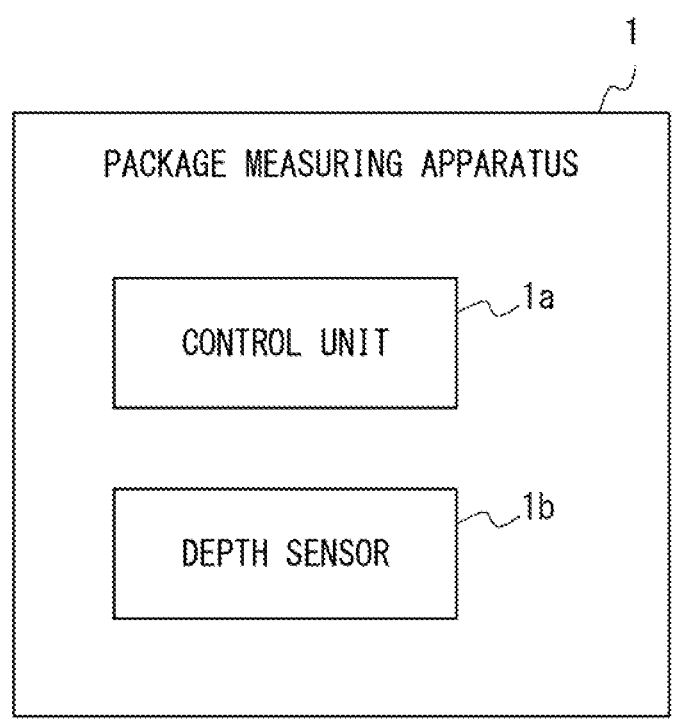
FIG. 1 is a functional block diagram showing an example of a configuration of a package measuring apparatus according to a first example embodiment.

FIG. 1 is a functional block diagram showing an example of a configuration of a package measuring apparatus according to a first example embodiment.

As shown in FIG. 1, a package measuring apparatus 1 according to the present example embodiment includes a control unit 1a and a depth sensor 1b. The package measuring apparatus 1 is configured to be able to calculate (measure) the size of a package using the depth sensor 1b based on the data acquired using the depth sensor 1b. This calculation can be performed by the control unit 1a.

The depth sensor 1b is disposed at a position at which the depth sensor can pick-up (detect) an image of a package having a rectangular parallelepiped shape and placed on a mounting table from directly above the package, picks-up (detects) the image of the package to thereby acquire a distance from the package. The depth sensor 1b may employ a TOF (Time Of Flight) method, or other measuring methods such as a pattern irradiation method may be employed for the depth sensor 1b. In addition, infrared light or the like may be used in performing the measurement, but there is no limitation thereto. It is needless to mention that the term "directly above" may be substantially directly above.

In addition, although not shown in FIG. 1, the package measuring apparatus 1 according to the present example embodiment may include the aforementioned mounting table. In this case, the depth sensor 1b can be attached to this mounting table. It is needless to mention that the depth sensor 1b is attached to the mounting table so that an image pick-up unit such as a lens is brought to a position where an image of the package can be picked-up from directly above the package. The mounting table is a table on which a package having a rectangular parallelepiped shape whose image is to be picked-up using the depth sensor 1b is placed, and there is no limitation on the shape of the mounting table other than that the mounting table basically has a planar mounting surface.

The control unit 1a calculates the size of the package based on the data of the package acquired from the depth sensor 1b. For example, the control unit 1a can be implemented by an integrated circuit (IC: Integrated Circuit). Further, the control unit 1a may be implemented by, for example, a CPU (Central Processing Unit), a work memory, and a non-volatile storage device storing a program.

A specific size calculation processing performed by the control unit 1a will be described.

The control unit 1a picks-up an image of the mounting table on which nothing is placed using the depth sensor 1b in advance and stores the picked-up image as background depth image data. The control unit 1a may include a storage device for storing the background depth image data. Note that the storage device for storing the background depth image data and the storage device for storing a program may be the same storage device.

In addition, the control unit 1a controls the depth sensor 1b so that the depth sensor 1b picks-up an image of the package placed on the mounting table from directly above the package to acquire the depth image data of the package. Then, the control unit 1a compares the depth image data of the package with the background depth image data to specify the data of the package (data of the part corresponding to the package) in the depth image data of the package.

Further, the control unit 1a calculates the height of the package based on the data of the distance from the depth sensor 1b to the upper surface of the package in the depth image data of the package and the data of the distance from the depth sensor 1b to the upper surface of the mounting table in the background depth image data of the package, Further, the control unit 1a specifies the position of first to third vertices described below. The first vertex is a vertex positioned on the leftmost side in the depth image data of the package. The second vertex is a vertex positioned on the rightmost side in the depth image data of the package. The third vertex is a vertex positioned on the uppermost side or the lowermost side in the depth image data of the package, and it may be decided in advance whether to adopt the uppermost side or the lowermost side.

The control unit 1a obtains the two-dimensional (planar) coordinates of the first vertex in the space in which the center of the depth sensor 1b is set as the point of origin as follows. That is, the control unit 1a obtains the two-dimensional coordinates of the first vertex based on the view angle of the depth sensor 1b, the data of the distance of the first vertex from the depth sensor 1b, the number of sensor elements of the depth sensor 1b, and the data of the position of a sensor element of the depth sensor 1b corresponding to the first vertex.

Similarly, the control unit 1a obtains the two-dimensional coordinates of the second vertex and the third vertex in the space in which the center of the depth sensor 1b is set as the point of origin as follows. That is, the control unit 1a obtains the two-dimensional coordinates of the second vertex based on the view angle of the depth sensor 1b, the data of the distance of the second vertex from the depth sensor 1b, the number of sensor elements of the depth sensor 1b, and the data of the position of a sensor element of the depth sensor 1b corresponding to the second vertex. In addition, the control unit 1a obtains the two-dimensional coordinates of the third vertex based on the view angle of the depth sensor 1b, the data of the distance of the third vertex from the depth sensor 1b, the number of sensor elements of the depth sensor 1b, and the data of the position of a sensor element of the depth sensor 1b corresponding to the third vertex.

Then, the control unit 1a calculates the lengths of a first side and a second side based on the two-dimensional coordinates of the first vertex, the second vertex, and the third vertex, outputs the result of the calculation. Here, the first side refers to a side defined between the first vertex and the third vertex, and the second side refers to a side defined between the second vertex and the third vertex. Note that the result of the calculation can be displayed on a display unit separately provided or can be printed out using a printer that is connected separately. As in this example, the result of the calculation may be output in any manner.

According to the package measuring apparatus 1 according to the present example embodiment, since the height and the lengths of left two sides of the package having a rectangular parallelepiped shape can be calculated using the depth sensor 1b, the size of the package can be measured even when a reference label whose size is known is not affixed to the package in advance.

Second Example Embodiment

Figure 2:
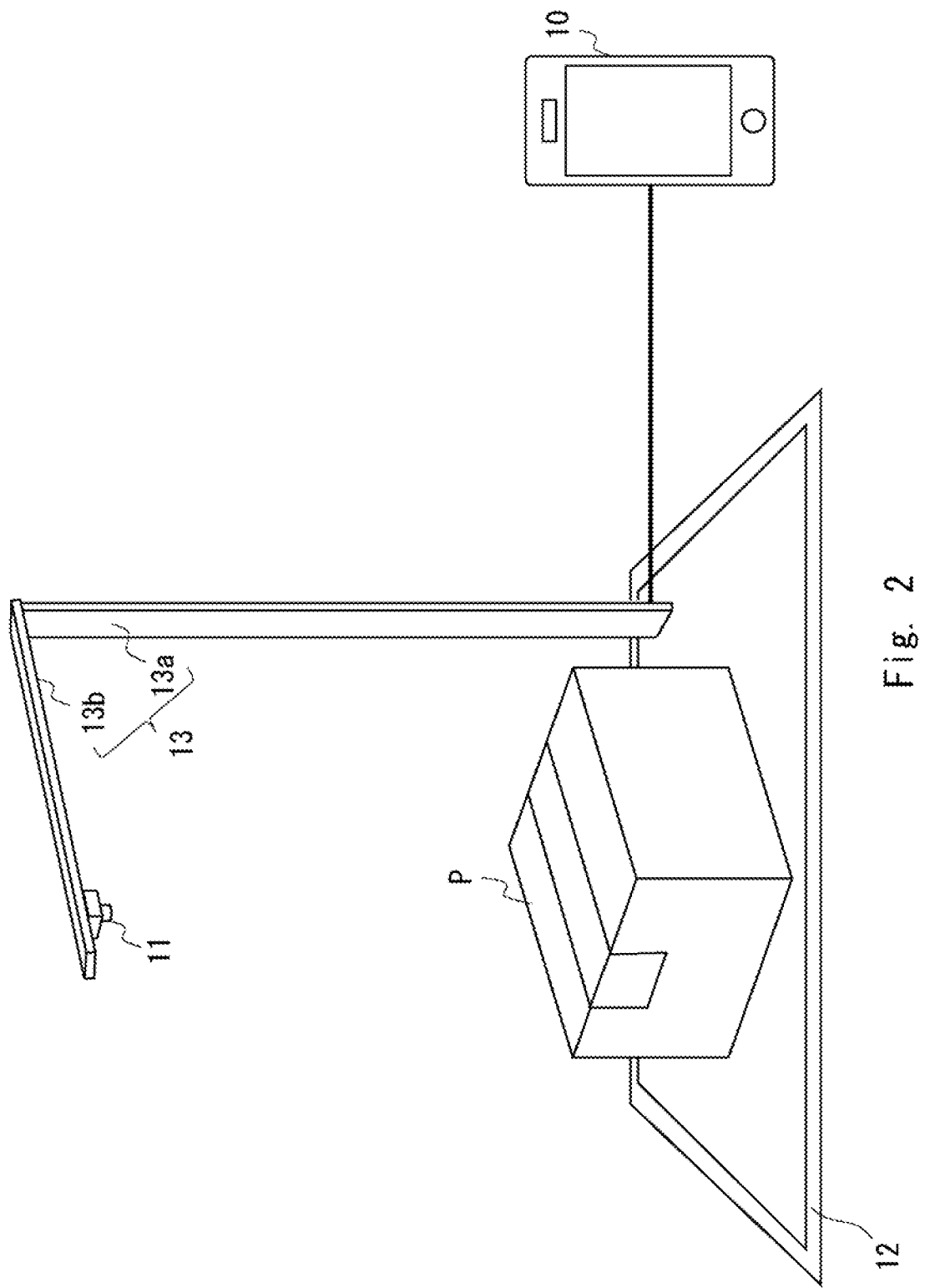
FIG. 2 is a schematic diagram showing an example of a configuration of a package measuring apparatus according to a second example embodiment.
Figure 3:
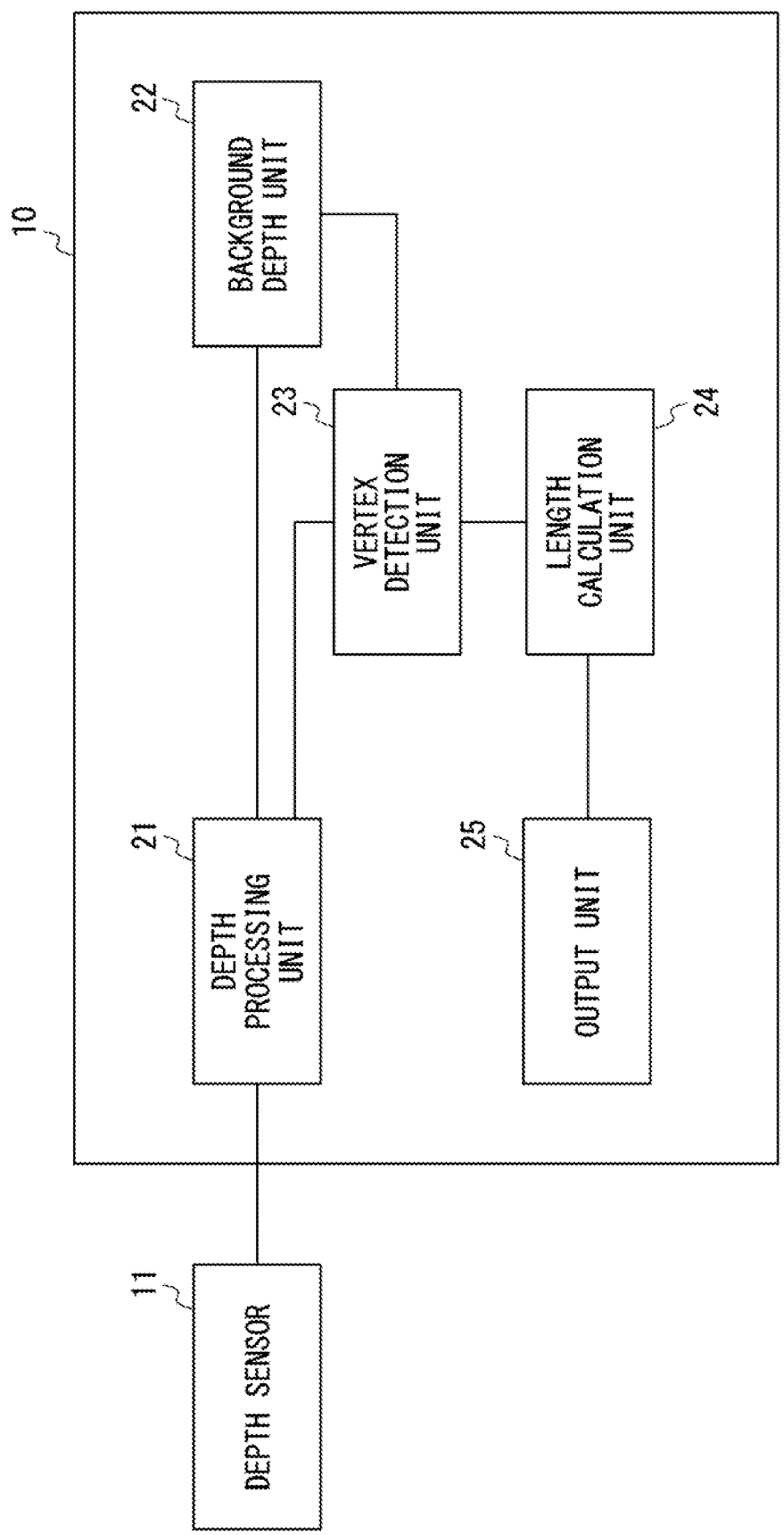
FIG. 3 is a functional block diagram showing the package measuring apparatus shown in FIG. 2.

While a second example embodiment will be described with reference to FIGS. 2 to 10, the difference from the first example embodiment will be mainly described. However, various examples described in the first example embodiment can be applied. FIG. 2 is a schematic diagram showing an example of a configuration of a package measuring apparatus according to the second example embodiment, and FIG. 3 is a functional block diagram showing the package measuring apparatus shown in FIG. 2.

As shown in FIG. 2, the package measuring apparatus according to the present example embodiment may include a tablet terminal 10 including the control unit 1a, a depth sensor 11 as an example of the depth sensor 1b, and a mounting table (a loading table) 12 to which the depth sensor 11 is attached.

The tablet terminal 10 is connected to the depth sensor 11 in a wired or wireless manner and can perform communication with the depth sensor 11. The tablet terminal 10 may include a communication interface or the like for establishing the connection described above. Note that the tablet terminal 10 may be a terminal referred to as a mobile PC (Personal Computer) or may be a device such as an installation type PC, a mobile phone (including those referred to as smartphones), or the like.

The package measuring apparatus shown in FIG. 2 is, for example, an apparatus for measuring, using the depth sensor 11, the size of the package P to be shipped, and may be installed at a corner of the store in order to reduce the burden of the store clerk who is working at the store where the package is accepted. The package may be a parcel for home delivery. Further, the store where the package is accepted is not limited to a drop-off point for the parcel for home delivery managed by a courier and may be a convenience store or the like which has contracted to provide the service of accepting the parcel for home delivery.

For example, the customer places a package P for which he or she is requesting shipment on the mounting table 12, confirms the size of the package P displayed on the tablet terminal 10 that belongs to the customer, performs the payment processing for the calculated shipping charge using the POS terminal installed within the store, and passes the package P onto the store clerk. In this way, the store can engage in the service of accepting the parcel for home delivery. At this time, the customer has the aforementioned program (an application software) installed on his or her tablet terminal 10. Then, under a state in which the software is activated and the package P is placed on the mounting table 12, the customer can start measurement of the package P by, for example, pressing down a software key for starting measurement mounted on the software. In addition, the customer can enter the address and the name of the recipient of the package through the software before the payment processing, and the customer can perform the payment processing for the shipping charge corresponding to the shipping distance. Note that as regards the payment processing, the payment processing can be performed through an electronic payment system using the tablet terminal 10 that belongs to the customer.

It is needless to mention that the service of accepting the parcel for home delivery may be provided by confirming, at the store using the tablet terminal 10 of the store, the size of the package P placed on the mounting table by the customer or the store clerk.

Next, the measurement of the package according to the present example embodiment will be described.

The depth sensor 11 may be a device with which the distance information within the image pick-up range can be acquired for every pixel (that is, for every sensor element). The depth sensor 11 acquires the distance from a plane with the depth sensor 11 set as the point of origin to the object to be shipped. The plane with the depth sensor set as the point of origin is a plane that is orthogonal to the camera axis (the sensor axis), which is a direction in which the depth sensor picks-up an image.

As shown in FIG. 2, the depth sensor 11 is a depth sensor installed just (directly) above the package so that an image of the package (the rectangular parallelepiped object) P placed on the mounting table 12 can be picked-up for the upper surface thereof (refer to FIG. 5), and acquires the distance to the package P. The distance to the package P may include at least the distance to each of the first to third vertices. Here, the sensor is configured on the assumption that the package P has a rectangular parallelepiped shape. Therefore, the expression "installed directly above" means that the sensor is installed such that the sensor is able to pick-up an image from the direction vertical to the plane of the mounting table 12. It is needless to mention that the term "directly above" may be substantially directly above. In a case where the package P is not a rectangular parallelepiped object, for example, the sensor may output an error.

The depth sensor 11 can be attached to the mounting table 12 via a sensor attachment portion 13. The sensor attachment portion 13 may include, for example, a pillar 13a installed vertically on the mounting table 12, and a sensor attachment member 13b installed at the upper end of the pillar 13a. The sensor attachment member 13b may include a mechanism to slide the depth sensor 11 so that the horizontal position of the depth sensor 11 (a separated distance from the pillar 13a) can be changed. In addition, the pillar 13a may include a mechanism that can change its height, which makes it possible to change the height of the depth sensor 11.

The tablet terminal 10 may include, as functional units corresponding to the control unit 1a, a depth processing unit 21, a background depth unit 22, a vertex detection unit 23, a length calculation unit (a measuring unit or a computing unit) 24, and an output unit 25 such as a screen output unit as shown in FIG. 3. These functional units 21 to 25 may be implemented by causing the CPU of the control unit 1a to execute the aforementioned software.

The depth processing unit 21 acquires data from the depth sensor 11 and stores the acquired data. The background depth unit 22 stores data acquired by picking-up an image of the mounting table 12 on which nothing is placed in advance. The vertex detection unit 23 determines the data of the package and the positions of the first to the third vertices. Therefore, the vertex detection unit 23 compares the depth information stored in the background depth unit 22 with the depth information indicating the state in which the package is present, extracts the part of the data that has changed, and detects the vertex information (the information indicating the first to the third vertices) from the extracted data.

The length calculation unit 24 calculates the distance between the vertices (that is, the length of each of the first and the second sides) from the information detected by the vertex detection unit 23 and passes the result of the calculation onto the output unit 25. The output unit 25 outputs the result of the calculation performed by the length calculation unit 24 (that is, the measurement result of the package) to the outside unit as well as the information related to the operations. The output unit 25 may be, for example, a display unit of the tablet terminal 10. Note that the output unit 25 may be a communication interface for outputting the result of the measurement to, for example, a printer for printing a shipment label to be affixed to the package P.

Figure 4:
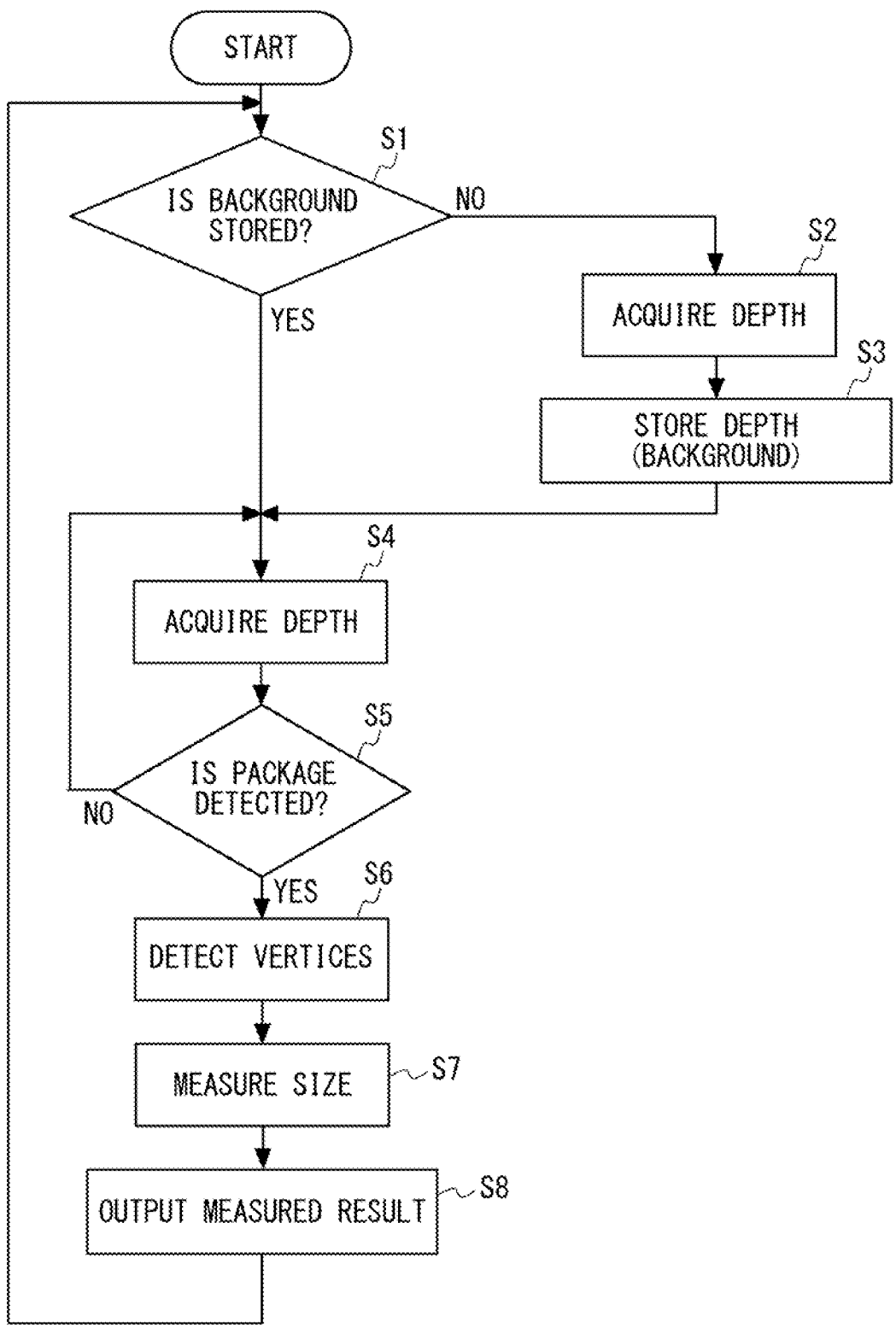
FIG. 4 is a flowchart for explaining an example of a package measurement processing implemented by the package measuring apparatus shown in FIG. 2.
Figure 5:
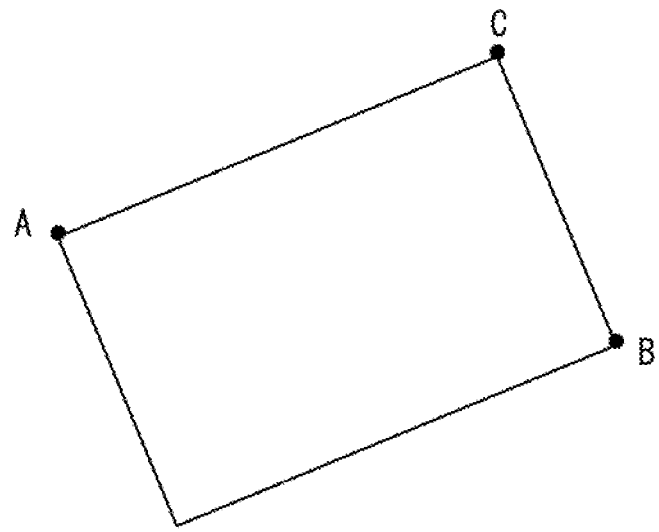
FIG. 5 is a schematic diagram for explaining an example of a vertex detection processing performed in the package measurement processing described in FIG. 4.
Figure 6:
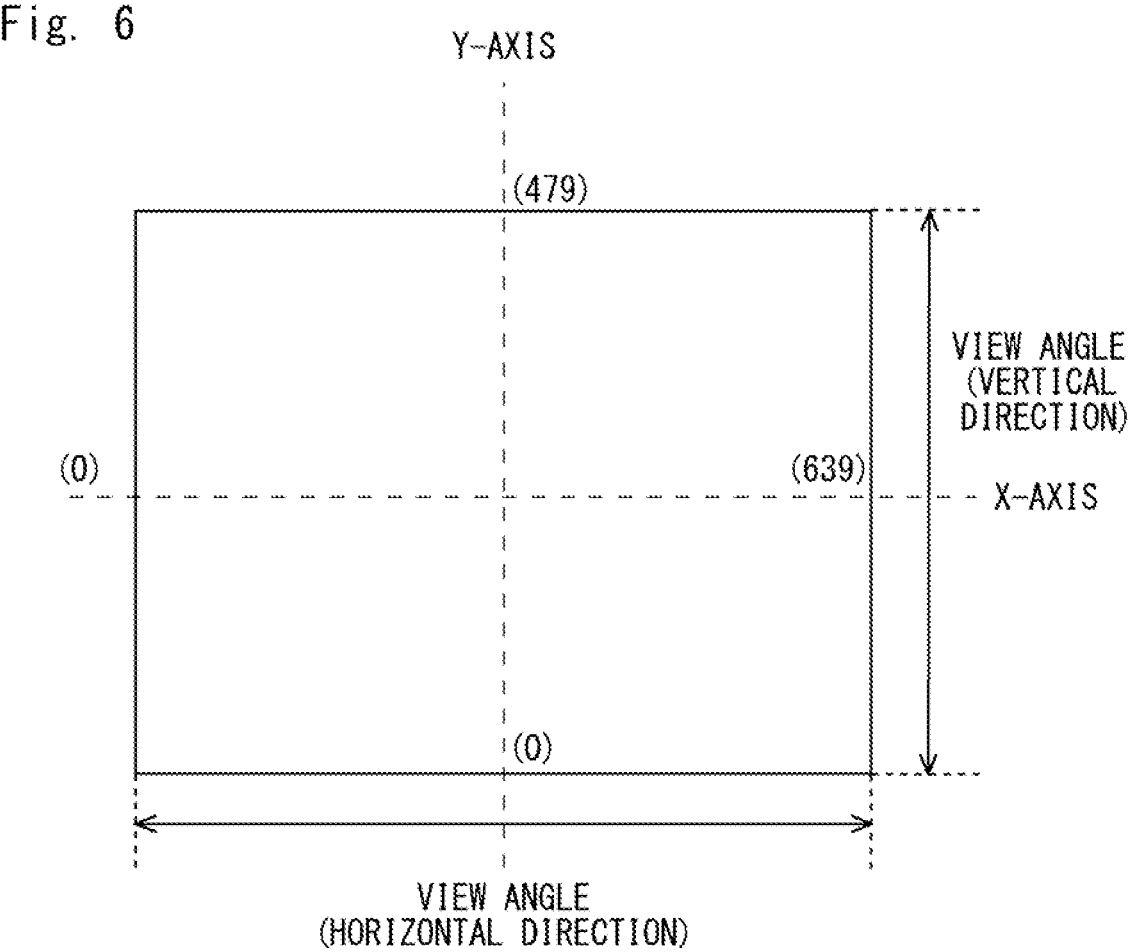
FIG. 6 is a diagram showing an example of a coordinate system used in the vertex detection processing performed in the package measurement processing described in FIG. 4.

Next, an operation example of the package measuring apparatus according to the present example embodiment will be described with reference to FIGS. 4 to 10. FIG. 4 is a flowchart for explaining an example of a package measurement processing implemented by the package measuring apparatus shown in FIG. 2. FIG. 5 is a schematic diagram for explaining an example of a vertex detection processing performed in the package measurement processing described in FIG. 4. FIG. 6 is a diagram showing an example of a coordinate system used in the vertex detection processing performed in the package measurement processing described in FIG. 4. FIGS. 7 to 10 are schematic diagrams for explaining an example of the vertex detection processing performed in the package measurement processing described in FIG. 4 based on the visual field of the depth sensor.

First, it is confirmed whether or not the background data (the background depth image data) is stored in advance since the vertex detection unit 23 uses the change in the depth (the distance to the object to be shipped) in detecting the object to be shipped (the package P) (Step S1). When it is NO in Step S1, that is, when the background depth image data is not stored in advance, the vertex detection unit 23 controls the depth sensor 11, acquires the background depth data from the background depth unit 22 (Step S2), and stores the acquired background depth image data (Step S3). Note that herein, an explanation is given in which, as an example, the trigger of the starting of the measurement of the package P is the change in the depth, however, the trigger may instead be, for instance, the operations performed by the customer (or the store clerk).

The vertex detection unit 23 acquires the depth data from the depth sensor 11 (Step S4). The vertex detection unit 23 determines whether or not the package P has been placed on the mounting table 12 (whether or not the package P has been detected) by determining whether or not there is a change in the depth indicated in the acquired data from the depth indicated in the background depth image data (Step S5).

When there is a change in the depth, the vertex detection unit 23 determines that the package P has been placed on the mounting table 12 and extracts the points where the depth has changed from the background depth acquired by the depth sensor 11. The points where the depth has changed are the points where the package P is present. Then, the vertex detection unit 23 detects the vertices of the package (the object to be shipped) P from among the points where the depth has changed (Step S6). In Step S6, first, based on the depth image data related to the package P extracted on the basis of the change in the depth acquired by the depth sensor 11, the three vertices A, B, and C shown in FIG. 5 can be determined. The vertices A, B, and C indicate the first vertex, the second vertex, and the third vertex, respectively. Note that in this example, an example in which the vertex positioned on the uppermost side is detected as the third vertex is employed.

Further, the three vertices A, B, and C may be detected by capturing an image of the package P with a camera (capturing an image within a region that is the same as the image pick-up region of the depth sensor 11) and acquiring an image, and then performing image recognition of the acquired image. As regards the camera, the depth sensor 11 equipped with a camera (also referred to as a depth camera) may be employed or a camera provided separately from the depth sensor 11 may be employed. As described above, the package measuring apparatus according to the present example embodiment further includes an image pick-up apparatus such as a camera, and the vertex detection unit 23 may be configured to detect the first to the third vertices by performing the image recognition of the image captured using the image pick-up apparatus. Note that by overlapping the region of the package in the depth image taken using the depth sensor 11 and the region of the package in the image taken using the camera over each other, it is possible to know which points in the depth image taken using the depth sensor 11 correspond to the three vertices in the image taken using the camera.

Further, when the three vertices cannot be detected from the change in the depth, the vertex detection unit 23 may perform an error output as described above or may display a message prompting adjustment of the position of the package P along with an image of the package P on the display unit of the tablet terminal 10. An example of the message to be displayed includes a message prompting the user to move or to turn the package P around so that the image of the upper surface of the package P can be picked-up. Note that the display unit may be an example of the output unit 25 and this kind of display control may be performed by a part of the control unit 1a shown in FIG. 1. Further, in this case, the vertex detection unit 23 and the output unit 25 are connected in FIG. 3 although this is not shown in the drawing.

As described above, the vertex detection unit 23 may be configured to capture an image of the package P placed on the mounting table 12 and to cause the display unit to display the captured image of the package P. The vertex detection unit 23 may also be configured to cause the display unit to display a message prompting adjustment of the mounting state of the package P when at least one of the vertices A to C of the package P cannot be specified. In addition, the vertex detection unit 23 may be configured to automatically detect the other side (the lowermost side in this example) when a predetermined side (for example, the uppermost side) cannot be detected for the third vertex.

Further, it is also possible to display the image of the package P on the display unit when all of the vertices A to C are detected. That is, the package measuring apparatus according to the present example embodiment may include an image pick-up apparatus such as a camera in the depth sensor 11 (or provided separately from the depth sensor 11), and may be configured so that the image of the package P captured using the image pick-up apparatus is displayed on the display unit of the tablet terminal 10.

Here, referring to FIG. 5, an example of determining the three vertices of the package P will be described. The depth sensor 11 is installed so that the image of the upper surface of the package P as shown in FIG. 5 can be obtained. As described above, the depth sensor 11 acquires the distance from the plane with the depth sensor 11 set as the point of origin to the object to be shipped. Therefore, the vertex detection unit 23 can acquire the data of the actual distance with respect to the certain point within the image pick-up region (the depth image) of the depth sensor 11 from the depth sensor 11. In addition, the vertex detection unit 23 can acquire, from the depth sensor 11, the data indicating which sensor element (which pixel) the certain point within the image pick-up region (the depth image) of the depth sensor 11 corresponds to, that is, the data of the position of the certain point within the image pick-up region (the depth image) of the depth sensor.

The vertex detection unit 23 can acquire information on the position of the package P within the image pick-up region of the depth sensor by comparing the data of the distance from the depth sensor to the package P when the package P is not placed on the mounting table with the data of the distance from the depth sensor to the package P when the package P is placed on the mounting table. As a result, the vertex detection unit 23 can specify the data of the distance from the plane with the depth sensor 11 set as the point of origin to each point of the package P. Then, the vertex detection unit 23 can determine the point of the package on the leftmost side to be a vertex A, the point of the package on the rightmost side to be a vertex B, and the point of the package on the uppermost side to be a vertex C. Note that the vertices A, B, and C need not be determined in the aforementioned order.

Note that when the package P is placed so that one side of the upper surface of the package P is parallel to a Y-axis of the depth sensor 11 (refer to FIG. 6), the lower end of one side of the upper surface of the package P parallel to the Y-axis (refer to FIG. 6) can be determined to be the vertex A, the upper end can be determined to be the vertex C, and the other end of one side extending from the vertex C can be determined to be the vertex B.

Following Step S6, the length calculation unit 24 measures the size of the package P (Step S7). The measurement of the size of the package P, that is, the method of calculating the actual dimensions of the height, the side AC, and the side BC in Step S7 will be described.

First, the height of the package P is calculated based on the data of the distance from the depth sensor 11 to the upper surface of the package P in the depth image data of the package P, and the date of the distance from the depth sensor 11 to the upper surface of the mounting table 12 in the background depth image data of the package P. Note that the distance from the depth sensor 11 to the upper surface of the package P and the distance from the depth sensor 11 to the upper surface of the mounting table 12 are obtained from the data of the depth sensor 11.

Next, the method of calculating the actual dimensions of the side AC and the side BC will be described.

As shown in FIG. 6, with the center of the depth sensor 11 set as the point of origin, the Z-axis represents the camera axis direction, the X-axis represents the direction coplanar with the Z-axis and orthogonal to the Z-axis, and the Y-axis represents the direction that is orthogonal to the X-axis and the Z-axis.

In order to calculate the actual dimensions of the side AC and the side BC, it is necessary to specify the plane (two-dimensional) coordinates of the points A, B, and C on the upper surface of the package P, that is, the two-dimensional coordinates excluding the height direction coordinates of the points A, B, and C, within the space defined by the X-axis, the Y-axis, and the Z-axis. The plane coordinates of the points A, B, and C are (Xa, Ya) for the point A, (Xb, Yb) for the point B, and (Xc, Yc) for the point C.

The method of calculating the plane coordinates of Xa, Ya of the point A will be described with reference to FIGS. 7 to 10.

Figure 7:
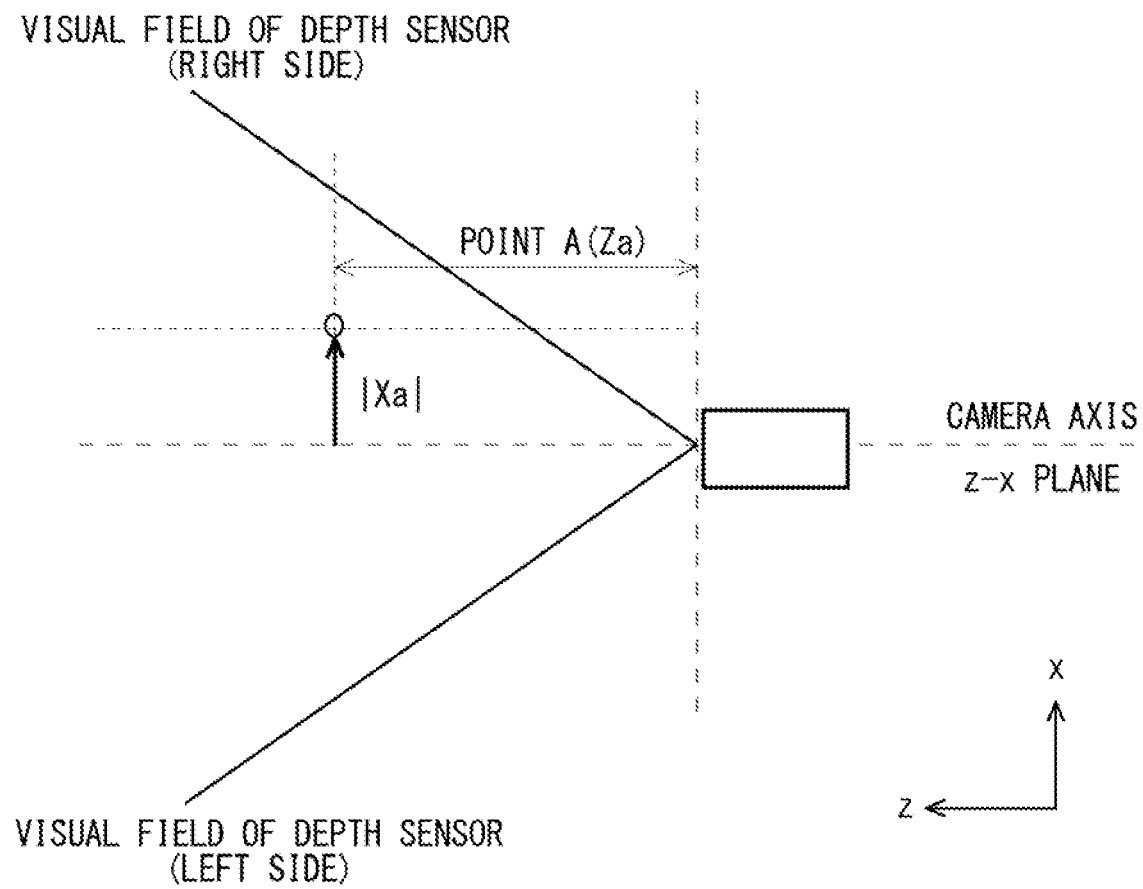
FIG. 7 is a schematic diagram for explaining an example of the vertex detection processing performed in the package measurement processing described in FIG. 4 based on a visual field of a depth sensor.
Figure 9:
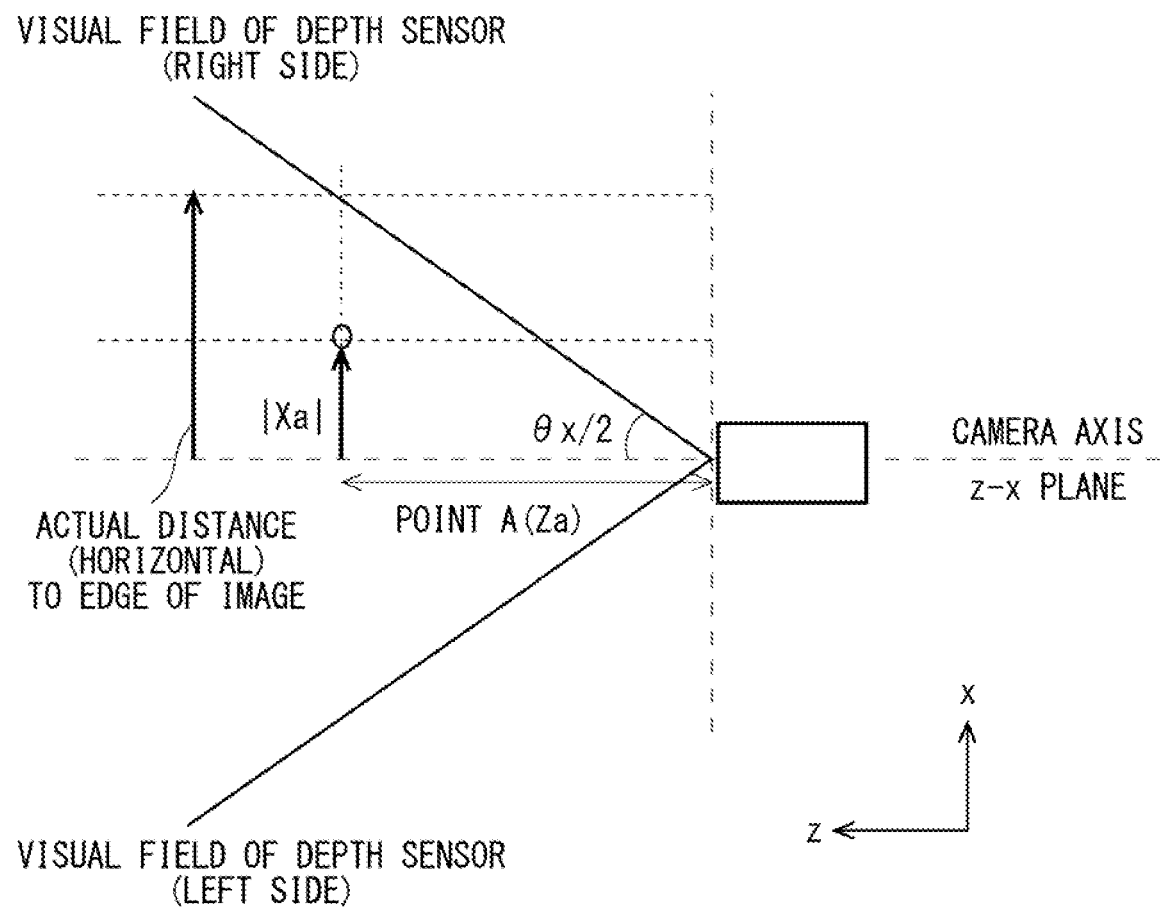
FIG. 9 is a schematic diagram for explaining an example of the vertex detection processing performed in the package measurement processing described in FIG. 4 based on a visual field of a depth sensor.

Assuming that the view angle of the depth sensor 11 in the X-axis direction is θx (degrees), the actual distance $X_{amaxp}$ to the edge of the image at the point A may be calculated from the following expression as understood from FIGS. 7 and 9. Here, Za represents a distance from the depth sensor 11 to the upper surface of the package P.

$$X_{amaxp} = Za \times \tan(\theta x/2)$$

Figure 8:
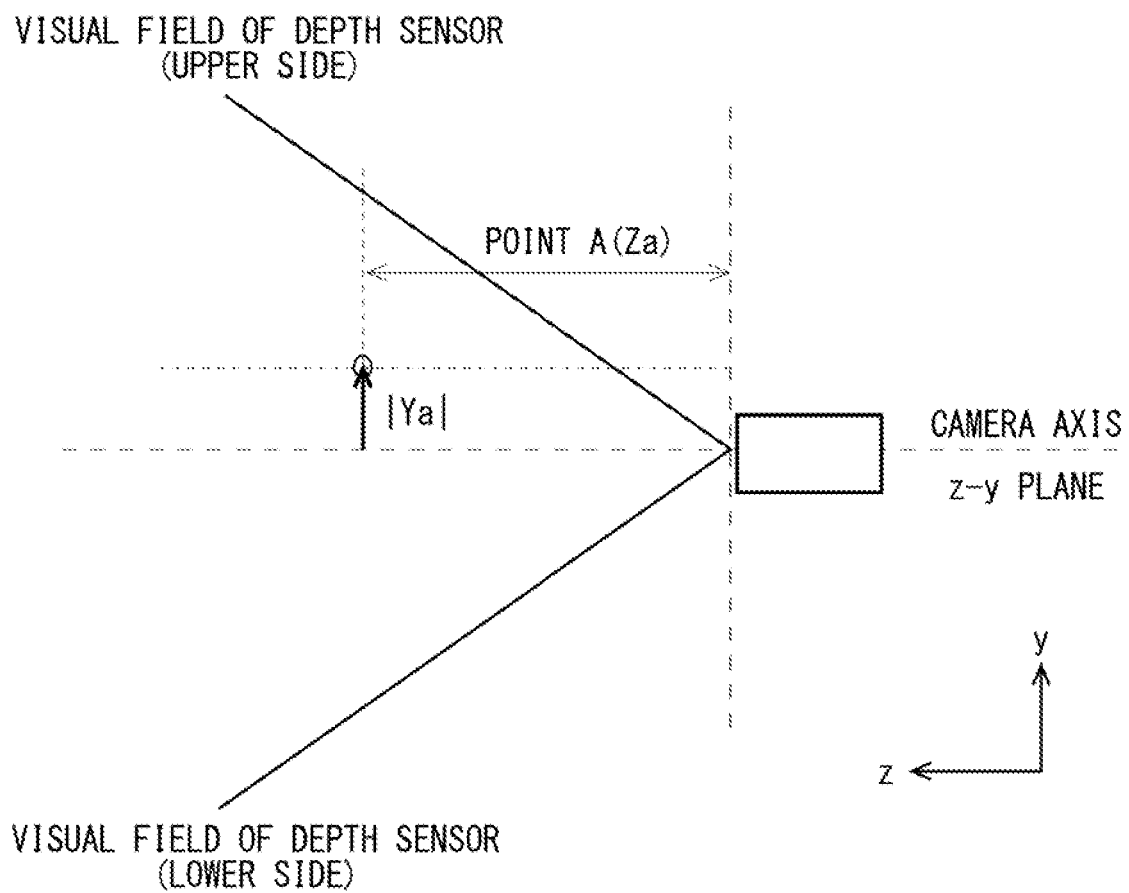
FIG. 8 is a schematic diagram for explaining an example of the vertex detection processing performed in the package measurement processing described in FIG. 4 based on a visual field of a depth sensor.
Figure 10:
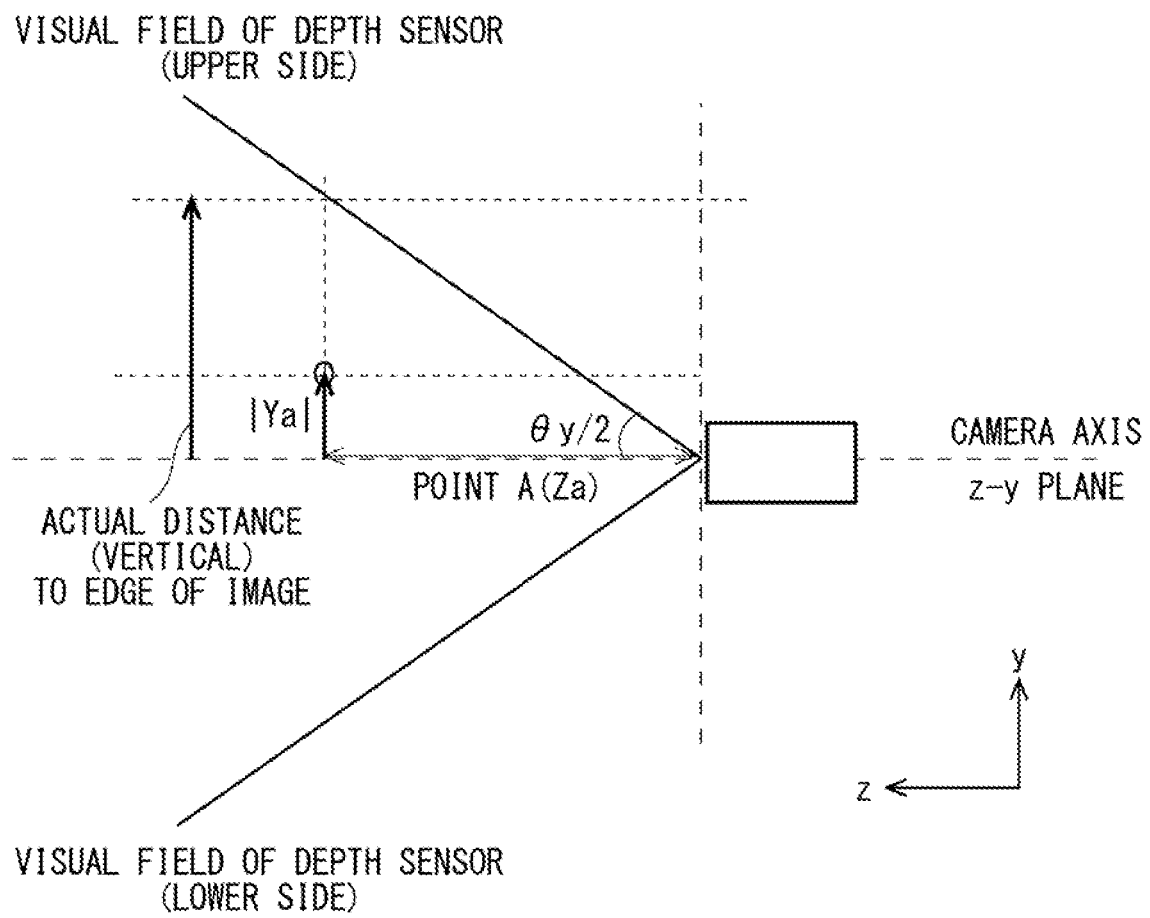
FIG. 10 is a schematic diagram for explaining an example of the vertex detection processing performed in the package measurement processing described in FIG. 4 based on a visual field of a depth sensor.

In addition, assuming that the view angle of the depth sensor 11 in the Y-axis direction is θy (degrees), the actual distance $Y_{amaxp}$ to the edge of the image at the point A may be calculated from the following expression as understood from FIGS. 8 and 10.

$$Y_{amaxp} = Za \times \tan(\theta y/2)$$

Here, it is assumed that the resolution of the depth image is 640 pixels in the X-axis direction and 480 pixels in the Y-axis direction. In this case, as exemplified in FIG. 6, the pixels (sensor elements) of No. 0 to No. 639 are disposed in the X-axis direction and the pixels (sensor elements) of No. 0 to No. 479 are disposed in the Y-axis direction. That is, in this case, the number of sensor elements in the X-axis direction and the number of sensor elements in the Y-axis direction are respectively 640 and 480. Hereinafter, an example in which the resolutions in the X-axis and Y-axis directions of the depth image are 640 pixels and 480 pixels will be given and described. However, each of the resolutions (number of sensor elements) Xnmr and Ynmr varies depending on the depth sensor 11 used.

The distance $X_{amaxp}$ corresponds to the distance from the point of origin (the center of the image) to the 640-th pixel (No. 639), and the distance $Y_{amaxp}$ corresponds to the distance from the point of origin (the center of the image) to the 480-th pixel (No. 479).

The data of the position of the point A within the image pick-up region (the depth image) of the depth sensor 11, that is, the data as to which pixel the point A corresponds to, can be acquired from the data acquired by the depth sensor 11. Therefore, when it is assumed that the position of the pixels (the sensor elements) in the X-axis and the Y-axis at the point A is represented by (No. Xa-pixel, No. Ya-pixel), Xa and Ya may be calculated from the following expressions, respectively.

$$Xa = \Delta Xa \times ((Xa\text{-pixel}) - 640/2)$$

$$Ya = \Delta Ya \times ((Ya\text{-pixel}) - 480/2)$$

Here, ΔXa is the change rate of each pixel (the sensor element) in the X-axis direction at the point A, which can be obtained from the (Expression) $\Delta Xa = X_{amaxp}/(640/2)$. Further, ΔYa is the change rate of each pixel (the sensor element) in the Y-axis direction at the point A, which can be obtained from the (Expression) $\Delta Ya = Y_{amaxp}/(480/2)$.

Similarly, the coordinates Xb, Yb of the point B and the coordinates Xc, Yc of the point C can be calculated.

Then, the length of the side AC can be calculated from the following expression.

$$\sqrt{((Xc-Xa)^2 + (Yc-Ya)^2)}$$

Similarly, the length of the side BC can be calculated from the following expression.

$$\sqrt{((Xc-Xb)^2 + (Yc-Yb)^2)}$$

Following Step S7, the output unit 25 outputs the result of the measurement of the size of the package P acquired by the length calculation unit 24 (Step S8). As described above, examples of outputting the result of the measurement include, for instance, displaying the result of the measurement on the screen of the tablet terminal 10 and printing out the result of the measurement using a printer not shown in the drawings. As another example, the output unit 25 may transmit the result of the measurement to other devices (for example, POS terminal) which are not shown in the drawings.

According to the present example embodiment described above, the package measuring apparatus by which the effect of the first example embodiment can be achieved is installed at a store or the like, and thus the package can be measured effectively and easily at a low cost. Therefore, according to the present example embodiment, it is possible to reduce the burden of the retailer and the operation of accepting the package can be performed by the customer himself or herself. In recent years, in accordance with the growth of online shopping and the consumer-to-consumer market, there has an increase in the use of the shipping service by individual users, and thus the effect achieved by the present example embodiment described above is beneficial.

Third Example Embodiment

Figure 11:
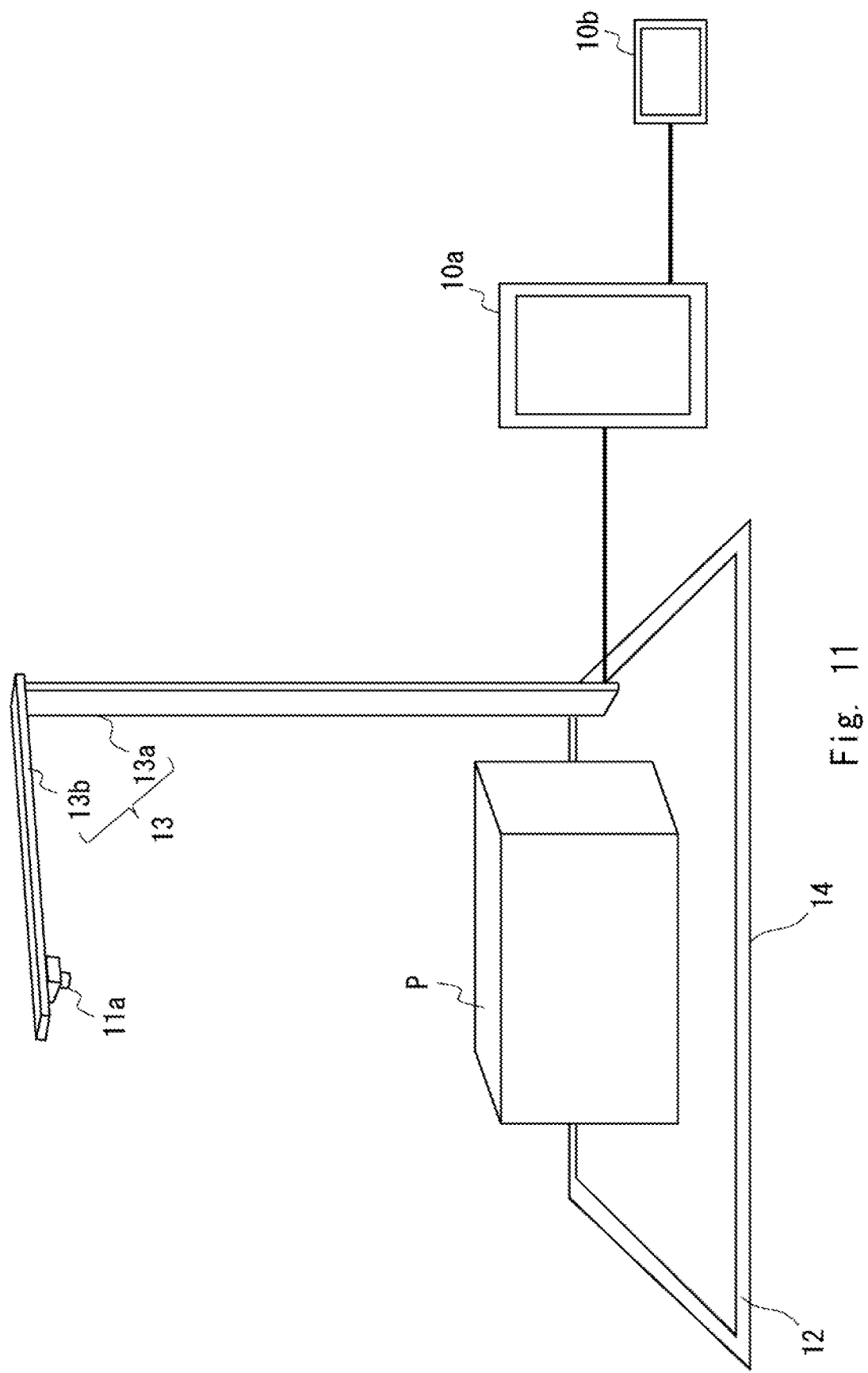
FIG. 11 is a schematic diagram showing an example of a configuration of a package accepting system that includes a package measuring apparatus according to a third example embodiment.
Figure 12:
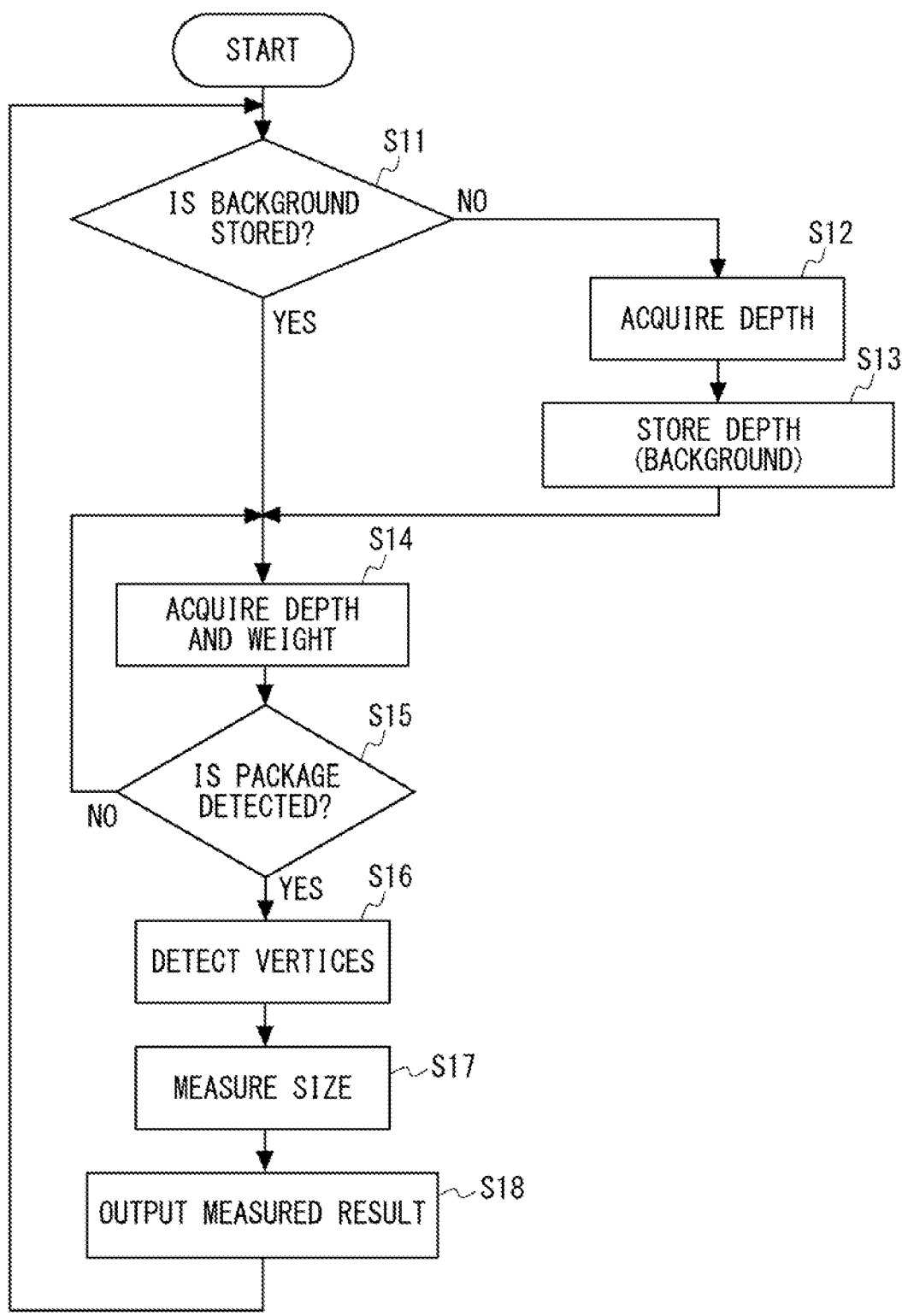
FIG. 12 is a flowchart for explaining an example of a package measurement processing implemented by the package measuring apparatus shown in FIG. 11.

A third example embodiment will be described with reference to FIGS. 11 and 12, the description being mainly on the difference from the second example embodiment including the effect thereof. However, in the third example embodiment, various examples described in the first and the second example embodiments can be applied. FIG. 11 is a schematic diagram showing an example of a configuration of a package accepting system that includes a package measuring apparatus according to the third example embodiment. FIG. 12 is a flowchart for explaining an example of a package measurement processing implemented by the package measuring apparatus shown in FIG. 11.

As shown in FIG. 11, the package accepting system according to the present example embodiment is a system for accepting the package P to be shipped. The package accepting system according to the present example embodiment includes the package measuring apparatus described in the second example embodiment as well as a payment processing apparatus for performing the payment processing for the shipping charge. The payment processing apparatus may be an electronic money reader/writer (R/W) 10b exemplified below, or may be other devices. The payment processing apparatus may further include a server connected to a network.

Further, the package measuring apparatus according to the present example embodiment includes a weighing scale 14 inside the mounting table 12. The weighing scale 14 measures the weight of the package P and outputs the result of the measurement to a self-checkout POS terminal 10a. Here, the self-checkout POS terminal 10a is a part of the package measuring apparatus according to the present example embodiment, and is an example of a terminal provided in place of the tablet terminal 10.

Further, the package accepting system according to the present example embodiment may include an image pick-up apparatus exemplified by the camera. Hereafter, an explanation of the system will be given taking the package accepting system including the camera-equipped depth sensor 11a as shown in FIG. 11 as an example. The self-checkout POS terminal 10a controls the camera of the camera-equipped depth sensor 11a so as to cause the camera to capture the image of a label (a shipment label or the like) affixed to the package P and in which the information items regarding the shipment are filled, whereby the information related to the shipment of the package P may be acquired by performing the character recognition processing or the like on the information related to the shipment of the package P.

Then, the self-checkout POS terminal 10a may calculate the shipping charge of the package P based on the size and the weight of the package P and on the information related to the shipment of the package P and may output the calculated shipping charge to the electronic money R/W 10b. Then, the electronic money R/W 10b performs the payment processing for the shipping charge of the package P.

As described above, the package accepting system according to the present example embodiment can measure not only the size of the package but also the weight of the package using the weighing scale 14, and the package accepting system according to the present example embodiment is different from the package accepting system according to the second example embodiment in that the shipping charge is calculated by performing the character recognition processing on the information contained in the shipment label affixed to the package P and the payment processing for the shipping charge is performed with the electronic money. An operation example of a package measuring apparatus in the package accepting system according to the present example embodiment (hereinafter, referred to as this system) will be described with reference to FIG. 12.

The self-checkout POS terminal 10a measures the package P placed on the mounting table 12 while controlling the camera-equipped depth sensor 11a through the control unit thereof and outputs the result of the measurement. In this operation example, the weight of the package P is measured in addition to the size of the package P in Step S4 in the operation example shown in FIG. 4 (Step S14). Other procedural steps are the same, that is, Steps S11 to S13 and Steps S15 to S18 described in FIG. 12 are the same as Steps S1 to S3 and Steps S5 to S8 described in FIG. 4, respectively. However, in Step S15, it may be determined that the package P has been detected based on the detection of the weight using the weighing scale 14.

Hereinafter, in the flow of processing from the measurement of the size and the weight of the package P to the payment for the shipping charge in this system will be described by way of an example.

The customer places the package P to which the shipment label is affixed so that the label is located within the image pick-up range in order to read the character information using the camera-equipped depth sensor 11a. That is, the customer places the package P so that the shipment label is affixed to the upper surface whose image can be picked-up. Note that the character information contained in the shipment label may be read with a camera different from the depth sensor. In this system, it is possible to acquire information as regards the shipping destination of the package P and the shipping method thereof from the image data picked-up by the camera-equipped depth sensor 11a by performing the character recognition processing on the image data. Note that the information of the shipment origin of the package P (that is, the information of the customer) may be acquired.

In general, the shipping charge of the package is calculated based on the information of the size of the package, the shipping destination (the distance to the shipping destination), and the shipping method. In this system, the size and the weight of the package are measured using the camera-equipped depth sensor 11a and the weighing scale 14, and the shipping destination and the shipping method are read using the camera-equipped depth sensor 11a. Further, in this system, the shipping charge of the package may be determined by referring to the tariff pre-stored in the self-checkout POS terminal 10a based on the information read as described above.

The customer then performs the payment processing for the shipping charge through the electronic money R/W 10b connected to the self-checkout POS terminal 10a. In performing the payment processing, the customer may use an IC card or a tablet terminal with an IC card function that belongs to the customer. After the payment processing is performed, a receipt and a slip copy for the store are output from the printer installed at the store, and the customer hands over the package and the slip copy for the store to the store clerk.

While the payment processing is performed with the electronic money in the aforementioned description, a cashier including a banknote handling machine and a coin handling machine may be connected to the self-checkout POS terminal so that the payment processing may be performed with cash. Further, both the electronic money R/W and the cashier may be provided.

As described above, in the present example embodiment, the customer can not only measure the size of the package even when a reference label whose size is known is not affixed to the package in advance like in the first and the second example embodiments but also perform the payment processing for the shipping charge whereby the burden imposed on the store clerk can be reduced. Further, according to the present example embodiment, there is no need to manually enter the shipping destination, the shipping date, the method of shipment, and the like, and thus it is possible to prevent error in entering these information.

In addition, while the self-checkout POS terminal 10a that is operated by the customer is disposed in the aforementioned description, a self-checkout POS terminal operated by the store clerk may be disposed instead. In this case, the POS terminal may serve as the payment processing apparatus. Further, in this system, an example of a case where the weight of the package P is measured using the weighing scale 14 for measuring the weight of the package P is given. However, in a case where the weight of the package is not relevant in calculating the shipping charge, there is no need to provide the weighing scale 14.

Further, in this system, the size of the package P was measured using the self-checkout POS terminal 10a. However, the size of the package P may be measured using the tablet terminal belonging to the customer described in the second example embodiment and the data of the measured size of the package P may be transmitted from the tablet terminal to the self-checkout POS terminal 10a. In order to perform the transmission, the tablet terminal may be configured to be able to establish communication with the depth sensor 11 (and the weighing scale 14) and the self-checkout POS terminal 10a.

Further, the package accepting system according to the present example embodiment may include, in place of the image pick-up apparatus, another type of information acquisition apparatus that acquires the shipping information such as a near field communication apparatus. By providing the near field communication apparatus and affixing a readable medium such as an RFID (radio frequency identifier) tag to the package P, the shipping information may be acquired.

Other Example Embodiments

[a]

In the first example embodiment, the function of the control unit 1a of the package measuring apparatus 1 shown in FIG. 1 has been described. However, this function may be realized by any other units of the package measuring apparatus 1. Similarly, in the second and third example embodiments, the functions of the functional units 21 to 25 shown in FIG. 3 have been described. However, these functions may be realized by any other units of the package measuring apparatus.

[b]

Figure 13:
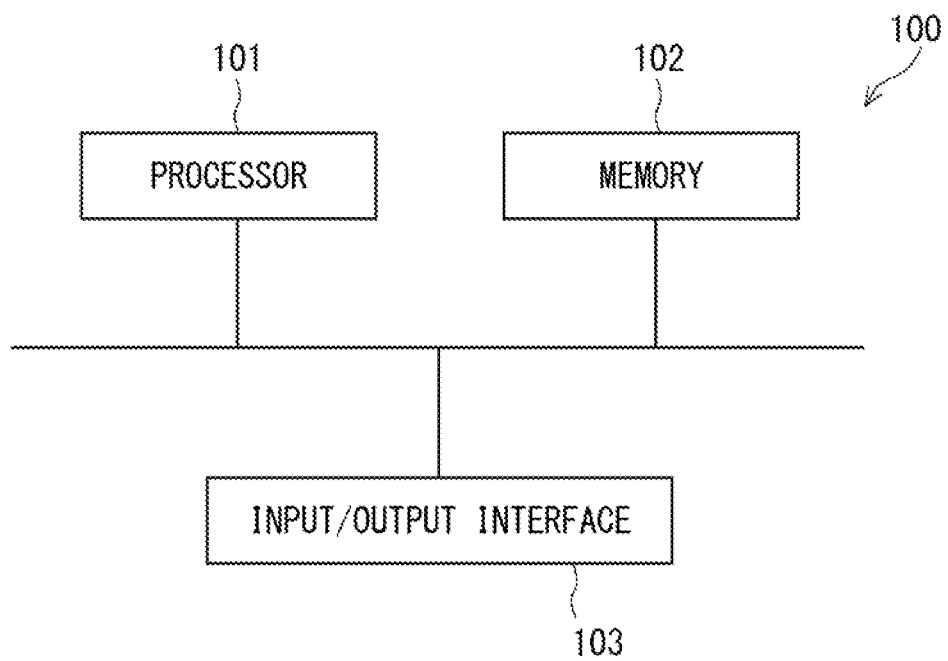
FIG. 13 is a diagram showing an example of a hardware configuration of a package measuring apparatus.

The package measuring apparatus according to the first to the third example embodiments may include a hardware configuration described below. FIG. 13 is a diagram showing an example of a hardware configuration of the package measuring apparatuses according to the first to third example embodiments. Note that the same applies for the other example embodiment [a].

The package measuring apparatus 100 shown in FIG. 13 includes a processor 101, a memory 102, an input/output interface 103 such as a depth sensor 1b (11). The function of the control unit 1a or the functions of the functional units 21 to 25 in the package measuring apparatuses described in the first to the third example embodiments are implemented by causing the processor 101 to read the program stored in the memory 102. This program may be a program for causing the processor 101 to function as the control unit 1a as described above. Further, this program may include a program for implementing the functions of at least one of the functional units 21 to 25.

In the above-described examples, the program can be stored and provided to a computer using any type of non-transitory computer readable media. Non-transitory computer readable media include any type of tangible storage media. Examples of non-transitory computer readable media include magnetic storage media (e.g., flexible disks, magnetic tapes, and hard disk drives), optical magnetic storage media (e.g., magneto-optical disks). Further, examples of non-transitory computer readable media include CD-ROM (Read Only Memory), CD-R, and CD-R/W. Further, examples of non-transitory computer readable media include semiconductor memories (e.g., mask ROM, PROM (Programmable ROM), EPROM (Erasable PROM), flash ROM, RAM (Random Access Memory). Further, the program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

[c]

Further, as exemplified in the aforementioned example embodiments, the procedural steps of the package measuring method performed in the package measuring apparatus can be adopted as the method of measuring the size of the package using the aforementioned depth sensor. Further, it can be said that the aforementioned program is a program for causing a computer to perform the aforementioned package measuring method.

Note that the present disclosure is not limited to each of the above-described example embodiments, and can be appropriately modified without departing from the spirit. Further, the present disclosure may be carried out by appropriately combining the respective example embodiments.

Some or all of the above-described example embodiments may also be described as in Supplementary Notes below, but are not limited thereto.

<Supplementary Notes>

(Supplementary Note 1)

A package measuring apparatus comprising:

a depth sensor disposed at a position at which the depth sensor is able to pick-up an image of a package having a rectangular parallelepiped shape and placed on a mounting table from substantially directly above the package, and configured to acquire a distance to the package by picking-up the image of the package; and a control unit configured to calculate a size of the package based on data acquired from the depth sensor, wherein the control unit performs processes of:

picking-up an image of the mounting table on which nothing is placed using the depth sensor in advance and storing the picked-up image as background depth image data;

controlling the depth sensor, acquiring depth image data of the package by picking-up the image of the package placed on the mounting table from substantially directly above the package using the depth sensor, and specifying data of the package in the depth image data of the package by comparing the depth image data of the package with the background depth image data;

calculating a height of the package based on data of a distance from the depth sensor to an upper surface of the package in the depth image data of the package and data of a distance from the depth sensor to an upper surface of the mounting table in the background depth image data of the package;

specifying a position of a first vertex positioned on a leftmost side in the depth image data of the package, a position of a second vertex positioned on a rightmost side in the depth image data of the package, and a position of a third vertex positioned on an uppermost side or a lowermost side in the depth image data of the package;

obtaining two-dimensional coordinates of the first vertex, the second vertex, and the third vertex in a space in which a center of the depth sensor is set as a point of origin based on a view angle of the depth sensor, data of a distance from the depth sensor to each of the first vertex, the second vertex, and the third vertex, respectively, the number of sensor elements of the depth sensor, and data of a position of each sensor element of the depth sensor corresponding to each of the first vertex, the second vertex, and the third vertex, respectively; and calculating, based on the two-dimensional coordinates of the first vertex, the second vertex, and the third vertex, a length of a first side defined between the first vertex and the third vertex, and a length of a second side defined between the second vertex and the third vertex, to output a calculated result.

(Supplementary Note 2)

The package measuring apparatus according to Supplementary Note 1, wherein the control unit performs processes of:

assuming that an image pick-up direction of the depth sensor is represented as a Z-axis, a direction coplanar with the Z-axis and orthogonal to the Z-axis is represented as an X-axis, and a direction orthogonal to the X-axis and the Z-axis is represented as a Y-axis, based on a view angle of the depth sensor in an X-axis direction and data of a distance of the first vertex, the second vertex, and the third vertex in a Z-axis direction, obtaining respective actual distances from the Z-axis to an image edge in the X-axis direction at the first vertex, the second vertex, and the third vertex, and based on a view angle of the depth sensor in a Y-axis direction and data of a distance of the first vertex, the second vertex, and the third vertex in the Z-axis direction, obtaining respective actual distances from the Z-axis to an image edge in the Y-axis direction at the first vertex, the second vertex, and the third vertex;

based on the actual distances from the Z-axis to the image edge in the X-axis direction at the first vertex, the second vertex, and the third vertex and the number of sensor elements of the depth sensor in the X-axis direction, obtaining respective rates of change of the actual distance of each of the sensor elements in the X-axis direction at the first vertex, the second vertex, and the third vertex, and based on the actual distances from the Z-axis to the image edge in the Y-axis direction at the first vertex, the second vertex, and the third vertex and the number of sensor elements of the depth sensor in the Y-axis direction, obtaining respective rates of change of the actual distance of each of the sensor elements in the Y-axis direction at the first vertex, the second vertex, and the third vertex; and based on positions of the sensor elements in the X-axis direction at the first vertex, the second vertex, and the third vertex and the rates of change of the actual distance of each of the sensor elements in the X-axis direction, obtaining respective X-coordinates at the first vertex, the second vertex, and the third vertex, and based on positions of the sensor elements in the Y-axis direction at the first vertex, the second vertex, and the third vertex and the rates of change of the actual distance of each of the sensor elements in the Y-axis direction, obtaining respective Y-coordinates at the first vertex, the second vertex, and the third vertex, thereby forming two-dimensional coordinates of the first vertex, the second vertex, and the third vertex.

(Supplementary Note 3)

The package measuring apparatus according to Supplementary Note 2, wherein the control unit performs processes of:

assuming that a Z-coordinate of the first vertex is Za, the view angle of the depth sensor in the X-axis direction is θx, and the number of sensor elements in the X-axis direction is Xnmr based on the data of the distance from the depth sensor at the first vertex, obtaining the rate of change ΔXa of the actual distance of each of the sensor elements in the X-axis direction at the first vertex as represented by an equation below;

$$\Delta Xa = Za \times \tan(\theta x/2)/(Xnmr/2)$$

assuming that the view angle of the depth sensor in the Y-axis direction is θy and the number of sensor elements in the Y-axis direction is Ynmr, obtaining the rate of change ΔYa of the actual distance of each of the sensor elements in the Y-axis direction at the first vertex as represented by an equation below;

$$\Delta Ya = Za \times \tan(\theta y/2)/(Ynmr/2)$$

assuming that an X-coordinate of the first vertex is Xa and the position of the sensor element in the X-axis direction at the first vertex is Xa–pixel, obtaining the X-coordinate of the first vertex as represented by an equation below;

$$Xa = \Delta Xa \times ((Xa\text{-pixel}) - Xnmr/2)$$

assuming that a Y-coordinate of the first vertex is Ya and the position of the sensor element in the Y-axis direction at the first vertex is Ya–pixel, obtaining the Y-coordinate of the first vertex as represented by an equation below; and $$Ya = \Delta Ya \times ((Ya\text{-pixel}) - Ynmr/2)$$

obtaining X-coordinates and Y-coordinates of the second vertex and the third vertex in the same manner.

(Supplementary Note 4)

The package measuring apparatus according to any one of Supplementary Notes 1 to 3, wherein the control unit performs a process of specifying the first vertex, the second vertex, and the third vertex, based on the depth image data of the package.

(Supplementary Note 5)

The package measuring apparatus according to any one of Supplementary Notes 1 to 3, further comprising an image pick-up apparatus, wherein the control unit performs a process of specifying the first vertex, the second vertex, and the third vertex by performing image recognition on an image acquired by the image pick-up apparatus.

(Supplementary Note 6)

The package measuring apparatus according to Supplementary Note 5, further comprising a display unit, wherein the control unit causes the image pick-up apparatus to pick up an image of the package on the mounting table, causes the display unit to display the image of the package, and causes the display unit to display a message prompting adjustment of a mounting state of the package when at least one of the first vertex, the second vertex, and the third vertex of the package is not able to be specified.

(Supplementary Note 7)

The package measuring apparatus according to any one of Supplementary Notes 1 to 6, further comprising the mounting table,
wherein the depth sensor is attached to the mounting table.

(Supplementary Note 8)

The package measuring apparatus according to any one of Supplementary Notes 1 to 7, further comprising a weighing scale inside the mounting table to measure a weight of the package and output a result of measurement.

(Supplementary Note 9)

A package accepting system comprising:
the package measuring apparatus according to any one of Supplementary Notes 1 to 8;
an information acquisition apparatus; and
a payment processing apparatus, wherein
the information acquisition apparatus acquires information related to shipment of the package,
the package measuring apparatus calculates a shipping charge of the package based on a size of the package and the information related to the shipment of the package, and
the payment processing apparatus performs payment processing for the shipping charge of the package.

(Supplementary Note 10)

A package measuring method for calculating a size of a package using a depth sensor disposed at a position at which the depth sensor is able to pick-up an image of a package having a rectangular parallelepiped shape and placed on a mounting table from substantially directly above the package, and configured to acquire a distance to the package by picking-up the image of the package, the method comprising:
picking-up an image of the mounting table on which nothing is placed using the depth sensor in advance and storing the picked-up image as background depth image data;
controlling the depth sensor, acquiring depth image data of the package by picking-up the image of the package placed on the mounting table from substantially directly above the package using the depth sensor, and specifying data of the package in the depth image data of the package by comparing the depth image data of the package with the background depth image data;
calculating a height of the package based on data of a distance from the depth sensor to an upper surface of the package in the depth image data of the package and data of a distance from the depth sensor to an upper surface of the mounting table in the background depth image data of the package;
specifying a position of a first vertex positioned on a leftmost side in the depth image data of the package, a position of a second vertex positioned on a rightmost side in the depth image data of the package, and a position of a third vertex positioned on an uppermost side or a lowermost side in the depth image data of the package;
obtaining two-dimensional coordinates of the first vertex, the second vertex, and the third vertex in a space in which a center of the depth sensor is set as a point of origin based on a view angle of the depth sensor, data of a distance from the depth sensor to each of the first vertex, the second vertex, and the third vertex, respectively, the number of sensor elements of the depth sensor, and data of a position of each sensor element of the depth sensor corresponding to each of the first vertex, the second vertex, and the third vertex, respectively; and
calculating, based on the two-dimensional coordinates of the first vertex, the second vertex, and the third vertex, a length of a first side defined between the first vertex and the third vertex, and a length of a second side defined between the second vertex and the third vertex, to output a calculated result.

(Supplementary Note 11)

A program for causing a computer to perform calculation processing of calculating a size of a package using a depth sensor disposed at a position at which the depth sensor is able to pick-up an image of a package having a rectangular parallelepiped shape and placed on a mounting table from substantially directly above the package, and configured to acquire a distance to the package by picking-up the image of the package,
the calculation processing including:
picking-up an image of the mounting table on which nothing is placed using the depth sensor in advance and storing the picked-up image as background depth image data;
controlling the depth sensor, acquiring depth image data of the package by picking-up the image of the package placed on the mounting table from substantially directly above the package using the depth sensor, and specifying data of the package in the depth image data of the package by comparing the depth image data of the package with the background depth image data;
calculating a height of the package based on data of a distance from the depth sensor to an upper surface of the package in the depth image data of the package and data of a distance from the depth sensor to an upper surface of the mounting table in the background depth image data of the package;
specifying a position of a first vertex positioned on a leftmost side in the depth image data of the package, a position of a second vertex positioned on a rightmost side in the depth image data of the package, and a position of a third vertex positioned on an uppermost side or a lowermost side in the depth image data of the package;
obtaining two-dimensional coordinates of the first vertex, the second vertex, and the third vertex in a space in which a center of the depth sensor is set as a point of origin based on a view angle of the depth sensor, data of a distance from the depth sensor to each of the first vertex, the second vertex, and the third vertex, respectively, the number of sensor elements of the depth sensor, and data of a position of each sensor element of the depth sensor corresponding to each of the first vertex, the second vertex, and the third vertex, respectively; and
calculating, based on the two-dimensional coordinates of the first vertex, the second vertex, and the third vertex, a length of a first side defined between the first vertex and the third vertex, and a length of a second side defined between the second vertex and the third vertex, to output a calculated result.

Although the present invention is described above with reference to the example embodiments, the present invention is not limited to the above-described example embodiments. Various modifications that can be understood by those skilled in the art can be made to the configuration and details of the present invention within the scope of the present invention.

This application is based upon and claims the benefit of priority from Japanese Patent Application No. 2019-206130, filed on Nov. 14, 2019, the entire contents of which are incorporated herein by reference.

REFERENCE SIGNS LIST 1, 100 PACKAGE MEASURING APPARATUS
1a CONTROL UNIT
1b, 11 DEPTH SENSOR
11a CAMERA-EQUIPPED DEPTH SENSOR
10 TABLET TERMINAL
10a SELF-CHECKOUT POS TERMINAL
10b ELECTRONIC MONEY READER/WRITER (R/W)
12 MOUNTING TABLE
13 SENSOR ATTACHMENT PORTION
13a PILLAR
13b SENSOR ATTACHMENT MEMBER
14 WEIGHING SCALE
21 DEPTH PROCESSING UNIT
22 BACKGROUND DEPTH UNIT
23 VERTEX DETECTION UNIT
24 LENGTH CALCULATION UNIT
25 OUTPUT UNIT
101 PROCESSOR
102 MEMORY
103 INPUT/OUTPUT INTERFACE

What is claimed is:

1. A package measuring apparatus comprising:
a depth sensor disposed at a position at which the depth sensor is able to pick-up an image of a package having a rectangular parallelepiped shape and placed on a mounting table from substantially directly above the package, and configured to acquire a distance to the package by picking-up the image of the package;
at least one memory; and
at least one processor coupled to the at least one memory and configured to calculate a size of the package based on data acquired from the depth sensor,
wherein the at least one processor performs processes of:
picking-up an image of the mounting table on which nothing is placed using the depth sensor in advance and storing the picked-up image as background depth image data;
controlling the depth sensor, acquiring depth image data of the package by picking-up the image of the package placed on the mounting table from substantially directly above the package using the depth sensor, and specifying data of the package in the depth image data of the package by comparing the depth image data of the package with the background depth image data;
calculating a height of the package based on data of a distance from the depth sensor to an upper surface of the package in the depth image data of the package and data of a distance from the depth sensor to an upper surface of the mounting table in the background depth image data of the package;
specifying a position of a first vertex positioned on a leftmost side in the depth image data of the package, a position of a second vertex positioned on a rightmost side in the depth image data of the package, and a position of a third vertex positioned on an uppermost side or a lowermost side in the depth image data of the package;
obtaining two-dimensional coordinates of the first vertex, the second vertex, and the third vertex in a space in which a center of the depth sensor is set as a point of origin based on a view angle of the depth sensor, data of a distance from the depth sensor to each of the first vertex, the second vertex, and the third vertex, respectively, the number of sensor elements of the depth sensor, and data of a position of each sensor element of the depth sensor corresponding to each of the first vertex, the second vertex, and the third vertex, respectively; and
calculating, based on the two-dimensional coordinates of the first vertex, the second vertex, and the third vertex, a length of a first side defined between the first vertex and the third vertex, and a length of a second side defined between the second vertex and the third vertex, to output a calculated result.

2. The package measuring apparatus according to claim 1, wherein the at least one processor performs processes of:
assuming that an image pick-up direction of the depth sensor is represented as a Z-axis, a direction coplanar with the Z-axis and orthogonal to the Z-axis is represented as an X-axis, and a direction orthogonal to the X-axis and the Z-axis is represented as a Y-axis, based on a view angle of the depth sensor in an X-axis direction and data of a distance of the first vertex, the second vertex, and the third vertex in a Z-axis direction, obtaining respective actual distances from the Z-axis to an image edge in the X-axis direction at the first vertex, the second vertex, and the third vertex, and based on a view angle of the depth sensor in a Y-axis direction and data of a distance of the first vertex, the second vertex, and the third vertex in the Z-axis direction, obtaining respective actual distances from the Z-axis to an image edge in the Y-axis direction at the first vertex, the second vertex, and the third vertex;
based on the actual distances from the Z-axis to the image edge in the X-axis direction at the first vertex, the second vertex, and the third vertex and the number of sensor elements of the depth sensor in the X-axis direction, obtaining respective rates of change of the actual distance of each of the sensor elements in the X-axis direction at the first vertex, the second vertex, and the third vertex, and based on the actual distances from the Z-axis to the image edge in the Y-axis direction at the first vertex, the second vertex, and the third vertex and the number of sensor elements of the depth sensor in the Y-axis direction, obtaining respective rates of change of the actual distance of each of the sensor elements in the Y-axis direction at the first vertex, the second vertex, and the third vertex; and
based on positions of the sensor elements in the X-axis direction at the first vertex, the second vertex, and the third vertex and the rates of change of the actual distance of each of the sensor elements in the X-axis direction, obtaining respective X-coordinates at the first vertex, the second vertex, and the third vertex, and based on positions of the sensor elements in the Y-axis direction at the first vertex, the second vertex, and the third vertex and the rates of change of the actual distance of each of the sensor elements in the Y-axis direction, obtaining respective Y-coordinates at the first vertex, the second vertex, and the third vertex, thereby forming two-dimensional coordinates of the first vertex, the second vertex, and the third vertex.

3. The package measuring apparatus according to claim 2, wherein the at least one processor performs processes of:

assuming that a Z-coordinate of the first vertex is Za, the view angle of the depth sensor in the X-axis direction is θx, and the number of sensor elements in the X-axis direction is Xnmr based on the data of the distance from the depth sensor at the first vertex, obtaining the rate of change ΔXa of the actual distance of each of the sensor elements in the X-axis direction at the first vertex as represented by an equation below;

$$\Delta Xa = Za \times \tan(\theta x/2)/(Xnmr/2)$$

assuming that the view angle of the depth sensor in the Y-axis direction is θy and the number of sensor elements in the Y-axis direction is Ynmr, obtaining the rate of change ΔYa of the actual distance of each of the sensor elements in the Y-axis direction at the first vertex as represented by an equation below;

$$\Delta Ya = Za \times \tan(\theta y/2)/(Ynmr/2)$$

assuming that an X-coordinate of the first vertex is Xa and the position of the sensor element in the X-axis direction at the first vertex is Xa-pixel, obtaining the X-coordinate of the first vertex as represented by an equation below;

$$Xa = \Delta Xa \times ((Xa\text{-pixel}) - Xnmr/2)$$

assuming that a Y-coordinate of the first vertex is Ya and the position of the sensor element in the Y-axis direction at the first vertex is Ya-pixel, obtaining the Y-coordinate of the first vertex as represented by an equation below; and $$Ya = \Delta Ya \times ((Ya\text{-pixel}) - Ynmr/2)$$

obtaining X-coordinates and Y-coordinates of the second vertex and the third vertex in the same manner.

4. The package measuring apparatus according to claim 1, wherein the at least one processor performs a process of specifying the first vertex, the second vertex, and the third vertex, based on the depth image data of the package.

5. The package measuring apparatus according to claim 1, further comprising an image pick-up apparatus,
wherein the at least one processor performs a process of specifying the first vertex, the second vertex, and the third vertex by performing image recognition on an image acquired by the image pick-up apparatus.

6. The package measuring apparatus according to claim 5, further comprising a display unit,
wherein the at least one processor causes the image pick-up apparatus to pick up an image of the package on the mounting table, causes the display unit to display the image of the package, and causes the display unit to display a message prompting adjustment of a mounting state of the package when at least one of the first vertex, the second vertex, and the third vertex of the package is not able to be specified.

7. The package measuring apparatus according to claim 1, further comprising the mounting table,
wherein the depth sensor is attached to the mounting table.

8. The package measuring apparatus according to claim 1, further comprising a weighing scale inside the mounting table to measure a weight of the package and output a result of measurement.

9. A package accepting system comprising:
the package measuring apparatus according to claim 1;
an information acquisition apparatus; and
a payment processing apparatus, wherein
the information acquisition apparatus acquires information related to shipment of the package,
the package measuring apparatus calculates a shipping charge of the package based on a size of the package and the information related to the shipment of the package, and
the payment processing apparatus performs payment processing for the shipping charge of the package.

10. A package measuring method for calculating a size of a package using a depth sensor disposed at a position at which the depth sensor is able to pick-up an image of a package having a rectangular parallelepiped shape and placed on a mounting table from substantially directly above the package, and configured to acquire a distance to the package by picking-up the image of the package, the method comprising:

picking-up an image of the mounting table on which nothing is placed using the depth sensor in advance and storing the picked-up image as background depth image data;

controlling the depth sensor, acquiring depth image data of the package by picking-up the image of the package placed on the mounting table from substantially directly above the package using the depth sensor, and specifying data of the package in the depth image data of the package by comparing the depth image data of the package with the background depth image data;

calculating a height of the package based on data of a distance from the depth sensor to an upper surface of the package in the depth image data of the package and data of a distance from the depth sensor to an upper surface of the mounting table in the background depth image data of the package;

specifying a position of a first vertex positioned on a leftmost side in the depth image data of the package, a position of a second vertex positioned on a rightmost side in the depth image data of the package, and a position of a third vertex positioned on an uppermost side or a lowermost side in the depth image data of the package;

obtaining two-dimensional coordinates of the first vertex, the second vertex, and the third vertex in a space in which a center of the depth sensor is set as a point of origin based on a view angle of the depth sensor, data of a distance from the depth sensor to each of the first vertex, the second vertex, and the third vertex, respectively, the number of sensor elements of the depth sensor, and data of a position of each sensor element of the depth sensor corresponding to each of the first vertex, the second vertex, and the third vertex, respectively; and calculating, based on the two-dimensional coordinates of the first vertex, the second vertex, and the third vertex, a length of a first side defined between the first vertex and the third vertex, and a length of a second side defined between the second vertex and the third vertex, to output a calculated result.

11. A non-transitory computer readable medium storing a program, the program being for causing a computer to perform calculation processing of calculating a size of a package using a depth sensor disposed at a position at which the depth sensor is able to pick-up an image of a package having a rectangular parallelepiped shape and placed on a mounting table from substantially directly above the package, and configured to acquire a distance to the package by picking-up the image of the package, the calculation processing including:
picking-up an image of the mounting table on which nothing is placed using the depth sensor in advance and storing the picked-up image as background depth image data;
controlling the depth sensor, acquiring depth image data of the package by picking-up the image of the package placed on the mounting table from substantially directly above the package using the depth sensor, and specifying data of the package in the depth image data of the package by comparing the depth image data of the package with the background depth image data;
calculating a height of the package based on data of a distance from the depth sensor to an upper surface of the package in the depth image data of the package and data of a distance from the depth sensor to an upper surface of the mounting table in the background depth image data of the package;
specifying a position of a first vertex positioned on a leftmost side in the depth image data of the package, a position of a second vertex positioned on a rightmost side in the depth image data of the package, and a position of a third vertex positioned on an uppermost side or a lowermost side in the depth image data of the package;
obtaining two-dimensional coordinates of the first vertex, the second vertex, and the third vertex in a space in which a center of the depth sensor is set as a point of origin based on a view angle of the depth sensor, data of a distance from the depth sensor to each of the first vertex, the second vertex, and the third vertex, respectively, the number of sensor elements of the depth sensor, and data of a position of each sensor element of the depth sensor corresponding to each of the first vertex, the second vertex, and the third vertex, respectively; and
calculating, based on the two-dimensional coordinates of the first vertex, the second vertex, and the third vertex, a length of a first side defined between the first vertex and the third vertex, and a length of a second side defined between the second vertex and the third vertex, to output a calculated result.

\* \* \* \* \*